(12) United States Patent
Yang et al.

(10) Patent No.: US 10,785,448 B2
(45) Date of Patent: *Sep. 22, 2020

(54) ROBUST HANDLING OF SUDDEN CHANGES OF BANDWIDTH IN SELECTIVE FORWARDING UNIT CONFERENCES

(71) Applicant: Dialogic Corporation, Montreal, Quebec (CA)

(72) Inventors: Kyeong Ho Yang, Freehold, NJ (US); Yisheng Zhao, Piscataway, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,300

(22) Filed: Sep. 12, 2019

(65) Prior Publication Data
US 2020/0169694 A1 May 28, 2020

Related U.S. Application Data

(63) Continuation of application No. 16/201,403, filed on Nov. 27, 2018, now Pat. No. 10,455,194.

(51) Int. Cl.
*H04N 7/14* (2006.01)
*H04N 7/15* (2006.01)
(Continued)

(52) U.S. Cl.
CPC ........... *H04N 7/15* (2013.01); *H04L 47/2416* (2013.01); *H04L 47/25* (2013.01); *H04N 7/147* (2013.01); *H04L 43/0882* (2013.01)

(58) Field of Classification Search
CPC ...................................................... H04N 7/14
See application file for complete search history.

(56) References Cited

U.S. PATENT DOCUMENTS 9,467,480 B2 * 10/2016 Mandyam ........... H04L 65/1003
9,712,570 B1 7/2017 Ivov et al.
(Continued)

OTHER PUBLICATIONS

"Advanced video coding for generic audiovisual services", Series H: Audiovisual and Multimedia Systems, Infrastructure of audiovisual services—Coding of moving video, ITU-T, Telecommunication Standardization Sector of ITU, Recommendation ITU-T H.264, Apr. 2017, 812 pages.
(Continued)

*Primary Examiner* — Olisa Anwah
(74) *Attorney, Agent, or Firm* — Adam R. Stephenson, LTD.

(57) ABSTRACT

Techniques for handling sudden changes in available bandwidth in videoconferences implemented with media servers employing SFUs. The techniques involve detecting a sudden drop in available egress network bandwidth from a media server to a video receiver, sending a request to a video sender currently sending a video stream to the media server for forwarding to the video receiver to reduce its transmission bitrate, determining whether to reset the forwarding of the video stream to the video receiver, and, having determined to reset the forwarding of the video stream to the video receiver, stopping the forwarding of the video stream to the video receiver, sending a request for an I-frame to the video sender for use in restarting the forwarding of the video stream to the video receiver, and, having received the requested I-frame, restarting the forwarding of the video stream from the video sender to the video receiver.

20 Claims, 6 Drawing Sheets

(51) Int. Cl.
*H04L 12/825* (2013.01)
*H04L 12/853* (2013.01)
*H04L 12/26* (2006.01)

(56) References Cited

U.S. PATENT DOCUMENTS

| | | |
|---|---|---|
| 9,843,606 B1 | 12/2017 | Vendrow et al. |
| 2018/0375906 A1 | 12/2018 | Ivov et al. |
| 2018/0375908 A1 | 12/2018 | Ivov et al. |

OTHER PUBLICATIONS

Westin et al., "RTP Payload Format for VP8 Video", Payload Working Group, Google, IETF Trust, Oct. 4, 2013, 30 pages.
"High efficiency video coding", Series H: Audiovisual and Multimedia Systems, Infrastructure of audiovisual services—Coding of moving video, ITU-T, Telecommunication Standardization Sector of ITU, Recommendation ITU-T H.265, Oct. 2014, 540 pages.
Sullivan et al., "Overview of High Efficiency Video Coding (HEVC) Standard", IEEE Transactions on Circuits and Systems for Video Technology, vol. 22, No. 12, Dec. 2012, 20 pages.
"VP9 Video Codec", The WebM Project, <<https://www.webmproject.org/vp9/>> Mar. 27, 2017, 4 pages.
Perkins et al., "Web Real-Time Communication (WebRTC): Media Transport and Use of RTP",RTCWEB Working Group, Aalto University, IETF Trust, Jun. 12, 2015, 45 pages.
Aboba, B., "Codec-Independent Selective Forwarding", AVTCORE Working Group, Microsoft Corporation, Jul. 6, 2015, 15 pages.
Grozev et al. "Last N: Relevance=Based Selectivity for Forwarding Video in Multimedia Conferences", Proceedings of the 25th ACM Workshop on Network and Operating Systems Support for Digital Audio and Video, Mar. 18-20, 2015, 6 pages.
Lennox et al., "Sending Multiple RTP Streams in a Single RTP Session", AVTCORE, University of Glasgow, Dec. 11, 2015, 27 pages.
Schulzrinne et al., "RTP: A Transport Protocol for Real-Time Applications", Network Working Group, Standards Track, The Internet Society, Jul. 2003, 89 pages.
Alvestrand, H., "RTCP message for Receiver Estimated Maximum Bitrate", Network Working Group, Google, IETF Trust, Oct. 21, 2013, 8 pages.
Ott et al., "Extended RTP Profile for Real-Time Transport Control Protocol (RTCP)—Based Feedback (RTP/AVPF)", Network Working Group, The Internet Society, Jul. 2006, 51 pages.
Johansson et al., "Support for Reduced-Size Real-Time Transport Control Protocol (RTCP): Opportunities and Consequences", Network Working Group, Apr. 2009, 17 pages.
Wenger et al., "Codec Control Messages in the RTP Audio-Visual Profile With Feedback (AVPF)", Network Working Group, Standards Track, Feb. 2008, 64 pages.
Holmer et al., "RTP Extensions for Transport-wide Congestion Control", Network Working Group, Google, IETF Trust, Oct. 19, 2015, 11 pages.
WebRTC, Mar. 21, 2018, 1 page.

\* cited by examiner

ROBUST HANDLING OF SUDDEN CHANGES OF BANDWIDTH IN SELECTIVE FORWARDING UNIT CONFERENCES

CROSS-REFERENCE TO RELATED APPLICATIONS

This application is a continuation of U.S. patent application Ser. No. 16/201,403 filed Nov. 27, 2018 entitled ROBUST HANDLING OF SUDDEN CHANGES OF BANDWIDTH IN SELECTIVE FORWARDING UNIT CONFERENCES.

BACKGROUND

Video communications including multi-party videoconferences have become increasingly popular due to widespread deployment of broadband networks, advancements in video compression technologies, and increased availability of low-cost tools for implementing web-based video communications. One approach to implementing multi-party videoconferences with server computers is based on the web real-time communication (WebRTC) standard. This approach employs selective forwarding units (SFU(s)), which operate to forward (or route) video packets in video streams to multiple participant devices without media processing. In a typical multi-party videoconference implemented with a central server computer employing an SFU, each participant device sends at least one video stream including real-time transport protocol (RTP)/user datagram protocol (UDP) video packets over a network (e.g., the Internet) to the central server computer, which selectively forwards or routes the video streams over the network to the respective participant devices such that each participant device receives one or more video streams from one or more of the other participant devices in the multi-party videoconference.

Multi-party videoconferences that involve sending/receiving video streams including RTP/UDP video packets over networks such as the Internet are often adversely affected by changes in available bandwidths between the central server computer and the respective participant devices. For example, such changes in available bandwidths may entail a sudden drop in available egress bandwidth from the central server computer to a respective video receiver device. In such a situation, the central server computer typically detects the drop in available egress bandwidth to the respective receiver device, and sends a request to at least one of the participant devices currently sending video streams received by the respective receiver device to reduce its transmission bitrate. However, the detection of the drop in available egress bandwidth and/or the subsequent reduction of the transmission bitrate at a respective video sender device may be delayed, causing packet losses and/or packet delivery delays that may result in a suboptimal quality of experience (QoE) at the respective receiver device.

SUMMARY

Improved systems and methods are disclosed herein for handling sudden changes in available bandwidth in videoconferences implemented with media servers having a selective forwarding unit (SFU) architecture. The disclosed systems and methods can involve a media server having an SFU architecture, and a plurality of participant devices communicably coupled to the media server over a network. While implementing a videoconference, the media server can detect a sudden drop in available egress bandwidth to a respective participant device among the plurality of participant devices (also referred to herein as the "video receiver device"), and send a request to another participant device among the plurality of participant devices currently sending a video stream (also referred to herein as the "video sender device") received by the video receiver device to reduce its transmission bitrate. Once the request to reduce the transmission bitrate is sent to the video sender device, the media server can determine whether to reset the forwarding of the video stream from the video sender device to the video receiver device. Having determined to reset the forwarding of the video stream from the video sender device to the video receiver device, the media server can stop the forwarding of the video stream from the video sender device to the video receiver device, and set a wait time before sending a request for an intra-frame (or I-frame) to the video sender device, thereby allowing time for congestion to be reduced on the egress network to the video receiver device. Once the wait time has expired, the media server can send the request for an I-frame to the video sender device for use in restarting the forwarding of the video stream to the video receiver device. Having received the requested I-frame from the video sender device, the media server can restart the forwarding of the video stream from the video sender device to the video receiver device.

In one aspect, a method of handling a decrease in available egress bandwidth from a media server having a selective forwarding unit (SFU) architecture to a first participant device among a plurality of participant devices includes detecting, by the media server, the decrease in the available egress bandwidth to the first participant device. A second participant device among the plurality of participant devices currently sends a video stream at a transmission bitrate to the media server for forwarding, by the media server, to the first participant device over an egress network. The method further includes sending a first request, by the media server, to the second participant device to reduce the transmission bitrate, and determining whether to reset the forwarding of the video stream currently being sent by the second participant device to the first participant device. Having determined to reset the forwarding of the video stream currently being sent by the second participant device to the first participant device, the method further includes stopping the forwarding of the video stream from the second participant device to the first participant device, and setting a wait time before sending a second request for an I-frame to the second participant device by the media server to allow time for congestion to be reduced on the egress network to the first participant device. The method still further includes, upon expiration of the wait time, sending the second request for an I-frame to the second participant device by the media server for use in restarting the forwarding of the video stream from the second participant device to the first participant device, and, having received the requested I-frame from the second participant device, restarting the forwarding of the video stream by the media server from the second participant device to the first participant device.

In an exemplary aspect, the media server includes a pacer buffer, and the determining of whether to reset the forwarding of the video stream currently being sent by the second participant device to the first participant device includes determining whether to reset the forwarding of the video stream to the first participant device based on a predetermined function of at least some of (i) the transmission bitrate at which the second participant device is sending the video stream, (ii) the available egress bandwidth to the first participant device, (iii) a delay from when the first request to reduce the transmission bitrate was sent to the second participant device to when the transmission bitrate is reduced, (iv) a packet delivery delay from the media server to the first participant device, (v) a rate of change of the packet delivery delay over time, (vi) a fullness of the pacer buffer within the media server, and (vii) a packet loss ratio from the media server to the first participant device.

In a further exemplary aspect, the method further includes receiving, at the media server, a real-time control protocol (RTCP) receiver report feedback message from the first participant device, and the determining of whether to reset the forwarding of the video stream to the first participant device is based further on the predetermined function of a ratio of (i) a first time duration over which a plurality of packets indicated in the RTCP receiver report feedback message were sent by the media server to the first participant device, to (ii) a second time duration from when a first one of the plurality of packets indicated in the RTCP receiver report feedback message was sent by the media server to when the RTCP receiver report feedback message was received at the media server.

In a further aspect, a multimedia system for handling a decrease in available egress bandwidth to a first participant device among a plurality of participant devices includes a media server having a selective forwarding unit (SFU) architecture. The media server includes processing circuitry configured to execute program instructions out of a memory (i) to detect the decrease in the available egress bandwidth to the first participant device, a second participant device among the plurality of participant devices currently sending a video stream at a transmission bitrate to the media server for forwarding to the first participant device over an egress network, (ii) to send a first request to the second participant device to reduce the transmission bitrate, (iii) to determine whether to reset the forwarding of the video stream currently being sent by the second participant device to the first participant device, (iv) having determined to reset the forwarding of the video stream currently being sent by the second participant device to the first participant device, to stop the forwarding of the video stream from the second participant device to the first participant device, and to set a wait time before sending a second request for an I-frame to the second participant device, thereby allowing time for congestion to be reduced on the egress network to the first participant device, (v) upon expiration of the wait time, to send the second request for an I-frame to the second participant device for use in restarting the forwarding of the video stream being sent by the second participant device to the first participant device, and (vi) having received the requested I-frame from the second participant device, to restart the forwarding of the video stream from the second participant device to the first participant device.

By detecting a sudden drop in available egress bandwidth on a network to a video receiver device, sending a request to a video sender device currently sending a video stream to reduce its transmission bitrate, determining whether to reset the forwarding of the video stream from the video sender device to the video receiver device, and, having determined to reset the forwarding of the video stream from the video sender device to the video receiver device, stopping the forwarding of the video stream from the video sender device to the video receiver device, setting a wait time before sending a request for an I-frame to the video sender device in order to allow time for congestion on the egress network to the video receiver device to be reduced, and, having received the requested I-frame from the second participant device, restarting the forwarding of the video stream from the second participant device to the first participant device, potential packet losses and/or packet delivery delays at the video receiver device can be avoided or reduced, beneficially improving a user's quality of experience (QoE) at the video receiver device.

Other features, functions, and aspects of the claimed invention will be evident from the Detailed Description that follows.

BRIEF DESCRIPTION OF THE DRAWINGS

The foregoing and other objects, features, and advantages will be apparent from the following description of particular embodiments of the claimed invention, as illustrated in the accompanying drawings, in which like reference characters refer to the same parts throughout the different views.

DETAILED DESCRIPTION

The disclosure of U.S. patent application Ser. No. 16/201,403 filed Nov. 27, 2018 entitled ROBUST HANDLING OF SUDDEN CHANGES OF BANDWIDTH IN SELECTIVE FORWARDING UNIT CONFERENCES is hereby incorporated herein by reference in its entirety.

Improved systems and methods are disclosed herein for handling sudden changes in available bandwidth in videoconferences implemented with media servers having selective forwarding unit (SFU) architectures. The disclosed systems and methods can involve (i) detecting, by a media server having an SFU architecture, a sudden drop in available egress bandwidth on a network to a video receiver device, (ii) sending, by the media server, a request to each video sender device currently sending a video stream received by the video receiver device to reduce its transmission bitrate, (iii) determining, by the media server, whether to reset the forwarding of the video stream from the video sender device to the video receiver device, (iv) having determined to reset the forwarding of the video stream from the video sender device to the video receiver device, stopping the forwarding of the video stream from the video sender device to the video receiver device, and setting, by the media server, a wait time before sending a request for an I-frame to the video sender device in order to allow time for congestion on the egress network to the video receiver device to be reduced, (v) upon expiration of the wait time, sending the request for an I-frame to the video sender device for use in restarting the forwarding of the video stream being sent by the video sender device to the video receiver device, and (vi) having received the requested I-frame from the video sender device, restarting the forwarding of the video stream from the video sender device to the video receiver device, potential packet losses and/or packet delivery delays at the video receiver device can be avoided or reduced, beneficially improving a user's quality of experience (QoE) at the video receiver device.

Figure 1A:
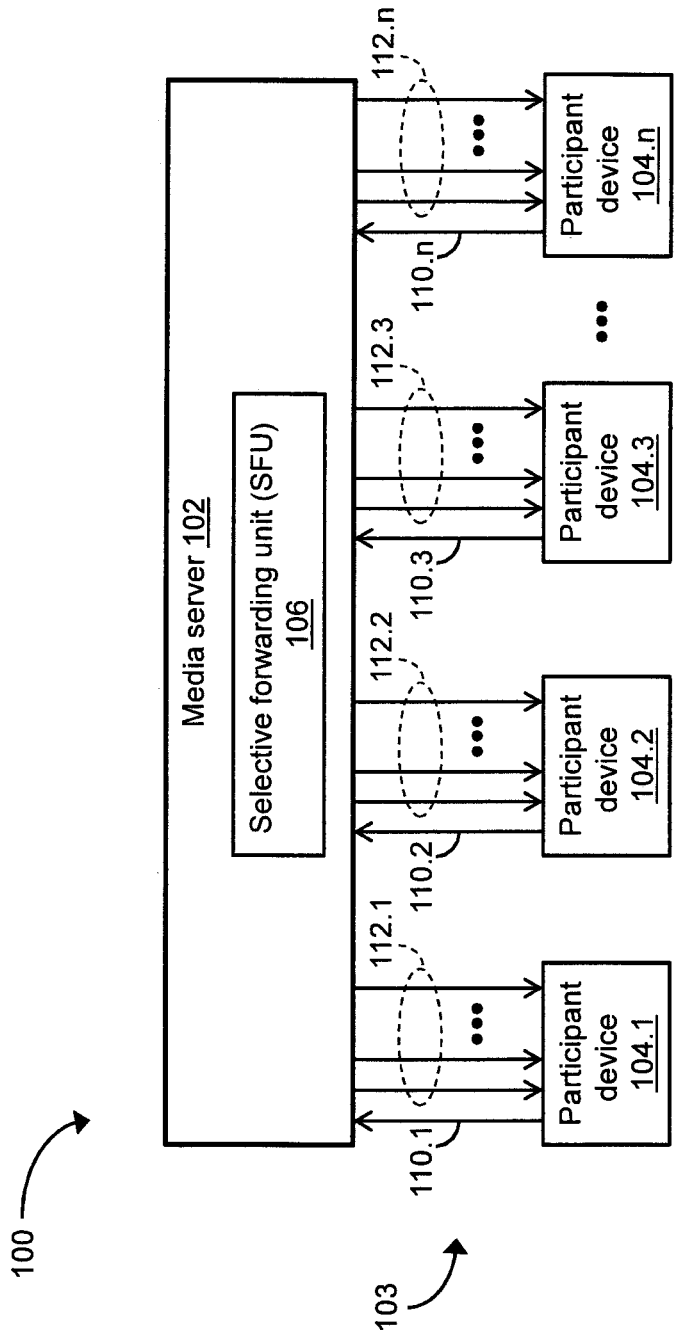
FIG. 1a is a block diagram of an exemplary system for providing video forwarding in real-time video applications involving a plurality of participant devices, including a media server having a selective forwarding unit (SFU) architecture communicably coupled to the plurality of participant devices.

FIG. 1a depicts an illustrative embodiment of an exemplary system 100 for providing video forwarding in real-time video applications involving a plurality of participant devices 104.1, 104.2, 104.3, . . . , 104.n, each of which can be implemented using any suitable multimedia client or server computer. As shown in FIG. 1a, the system 100 can include a media server 102 having an SFU architecture communicably coupled to the plurality of participant devices 104.1, 104.2, 104.3, . . . , 104.n by a communications medium 103, which can include one or more wired and/or wireless, public and/or private communications networks (e.g., local area networks (LANs), metropolitan area networks (MAN), wide area networks (WANs), the Internet), communications paths, and/or communications links. For example, such real-time video applications may include multi-party videoconference applications, video chat applications, or any other suitable real-time video applications. In one embodiment, the web real-time communication (WebRTC) standard can be employed to implement a multi-party videoconference within the system 100 of FIG. 1a. The WebRTC standard is a set of protocols and application programming interfaces (APIs) defined by the World Wide Web Consortium (W3C) and the Internet Engineering Task Force (IETF). The set of protocols and APIs of the WebRTC standard can support browser-to-browser applications such as voice calling, videoconference, video chat, and peer-to-peer (P2P) file sharing applications, while avoiding the need for plugins to connect video communications endpoints.

It is noted that the media server 102 of FIG. 1a can be employed to provide a low-cost solution to deployment of a multi-party WebRTC videoconference. In such a deployment, each of the plurality of participant devices 104.1, . . . , 104.n can send one or more video streams including real-time transport protocol (RTP)/user datagram protocol (UDP) video packets to the media server 102. For example, the participant device 104.1 may send a video stream to the media server 102 over a communications path 110.1. Likewise, the participant devices 104.2, 104.3, . . . , 104.n may send video streams to the media server 102 over communications paths 110.2, 110.3, . . . , 110.n, respectively.

Further, the media server 102 can function as a video packet router, receiving, at an SFU 106, the video streams from the respective devices 104.1, . . . , 104.n, and selectively forwarding (or routing), via the SFU 106, a plurality of video streams to each participant device 104.1, . . . , 104.n. For example, the SFU 106 may selectively forward or route, over respective communications paths, (i) a plurality of video streams 112.1 (which may include the video streams sent to the media server 102 over the respective communications paths 110.2, 110.3, . . . , 110.n) to the participant device 104.1, (ii) a plurality of video streams 112.2 (which may include the video streams sent to the media server 102 over the respective communications paths 110.1, 110.3, . . . , 110.n) to the participant device 104.2, (iii) a plurality of video streams 112.3 (which may include the video streams sent to the media server 102 over the respective communications paths 110.1, 110.2, 110.4, . . . , 110.n) to the participant device 104.3, and so on, up to a plurality of video streams 112.n (which may include the video streams sent to the media server 102 over the respective communications paths 110.1, 110.2, . . . , 110.n-1) to the participant device 104.n.

While implementing a videoconference (such as a multi-party WebRTC videoconference), the media server 102 can detect a sudden drop in available egress bandwidth to a respective participant device among the plurality of participant devices 104.1, . . . , 104.n. FIG. 1b depicts an exemplary arrangement of the system 100, in which a sudden drop in available egress bandwidth has occurred from the media server 102 to the participant device 104.4. It is noted that such a sudden drop in available egress bandwidth can occur from the media server 102 to any of the respective participant devices 104.1, 104.2, 104.3, 104.4, . . . . As shown in FIG. 1b, the sudden drop in available egress bandwidth is associated with the respective communications paths over which the video streams 112.4 were forwarded or routed to the participant device 104.4 by the SFU 106.

Figure 1C:
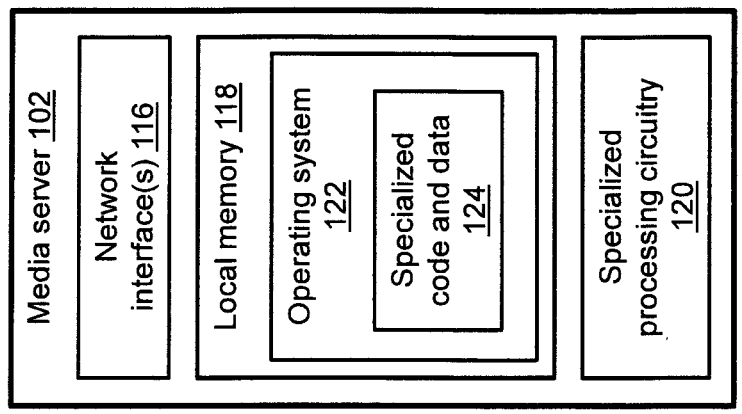
FIG. 1c is a block diagram of the media server of FIG. 1b, in which the media server includes a local memory having specialized code and data for handling the sudden drop in available egress bandwidth from the media server to the respective participant device of FIG. 1b, and specialized processing circuitry for executing the specialized code.
Figure 1B:
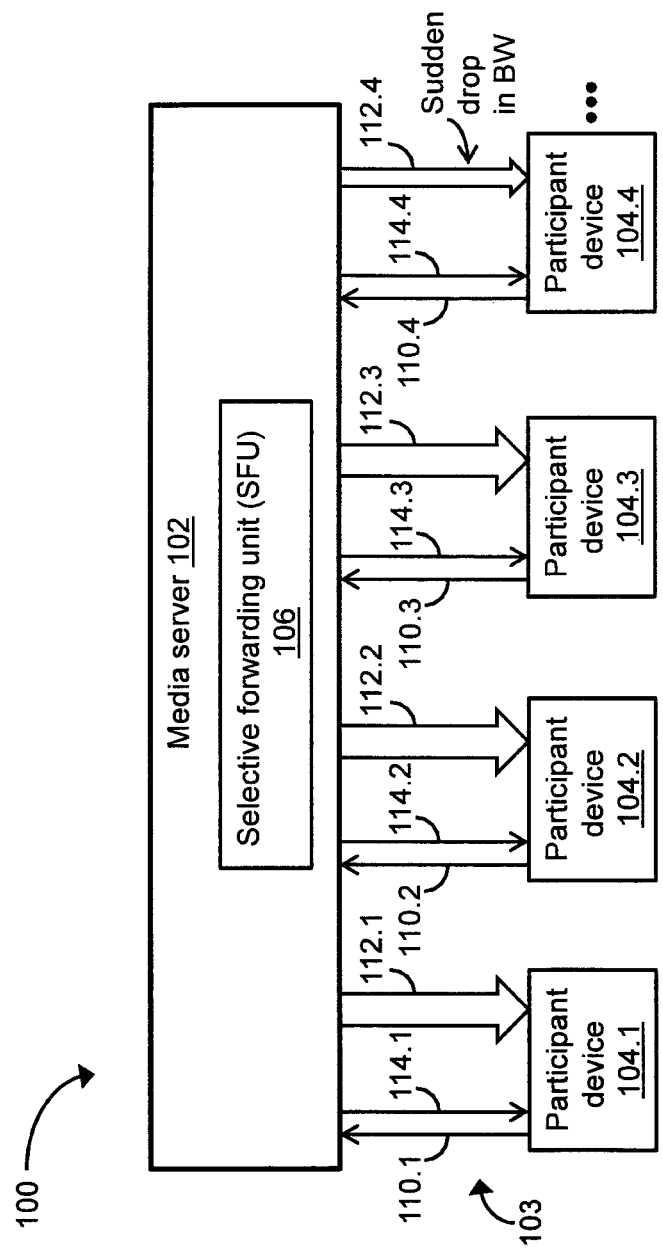
FIG. 1b is a block diagram of the system of FIG. 1a, in which a respective participant device among the plurality of participant devices experiences a sudden drop in available egress bandwidth from the media server to the respective participant device.

FIG. 1c depicts a detailed view of the media server 102 having the SFU architecture, which can include one or more network interfaces 116, a local memory 118, and specialized processing circuitry 120. As shown in FIG. 1c, the local memory 118 can include specialized code (and data) 124 running on an operating system 122 for handling a sudden drop in available egress bandwidth from the media server 102 to a respective participant device, such as the participant device 104.4 (see FIG. 1b). The network interface(s) 116 can be configured to connect the media server 102 to the communications medium 103 (see FIG. 1b), enabling bidirectional communications between the media server 102 and the respective participant devices 104.1, . . . , 104.n. The local memory 118 can be configured to include buffer storage, volatile storage (e.g., dynamic random access memory (DRAM), static random access memory (SRAM)), and/or non-volatile storage (e.g., magnetic memory, flash memory). The specialized code (and data) 124 included in the local memory 118 can encompass a variety of software constructs (e.g., software units, components, and/or modules), each of which can include one or more sets of program instructions that direct the specialized processing circuitry 120 to implement video forwarding in real-time video applications, as well as handle sudden drops in available egress bandwidth from the media server 102 to the respective participant devices 104.1, . . . , 104.n. The specialized processing circuitry 120 can be configured to operate in accordance with the specialized code (and data) 124 stored in the local memory 118, and can be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof.

The disclosed systems and methods of handling sudden changes in available bandwidth in videoconferences implemented with media servers having SFU architectures will be further understood with reference to the following illustrative example, as well as FIGS. 1b, 2a-2d, and 3. In this example, it is assumed that the media server 102 (see FIG. 1b) has been employed to implement a multi-party videoconference involving the participant devices 104.1, 104.2, 104.3, 104.4, . . . , and that the sudden drop in available egress bandwidth has occurred from the media server 102 to the participant device 104.4 (also referred to herein as the "video receiver device"). It is further assumed that no such drop in available egress bandwidth has occurred from the media server 102 to any of the other participant devices 104.1, 104.2, 104.3, 104.5, and so on, in the multi-party videoconference.

Figure 2A:
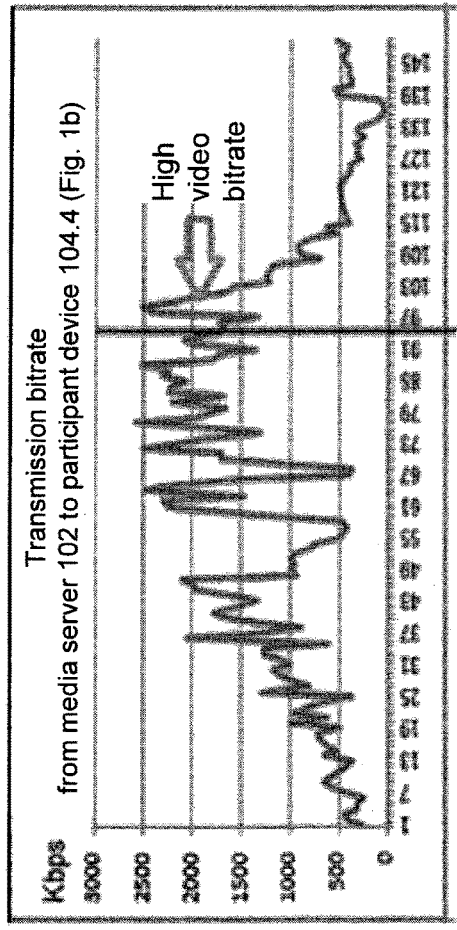
FIG. 2a is a diagram illustrating a transmission bitrate from the media server of FIG. 1b to the respective participant device of FIG. 1b.

FIGS. 2a-2d depict a plurality of diagrams 202, 204, 206, 208, respectively, which show potential effects of the sudden drop in available egress bandwidth (e.g., from about 2.0 megabits per second (Mbps) to 600 kilobits per second (Kbps)) from the media server 102 (see FIG. 1b) to the video receiver device 104.4 during the multi-party videoconference. It is noted that such potential effects of the sudden drop in available egress bandwidth can result in a suboptimal quality of experience (QoE) at the video receiver device 104.4. FIG. 2a depicts the diagram 202, which illustrates the transmission bitrate for the plurality of video streams 112.4 (see FIG. 1b) selectively forwarded or routed from the media server 102 to the video receiver device 104.4. As shown in FIG. 2a, the sudden drop in available egress bandwidth from the media server 102 to the video receiver device 104.4 occurs at about horizontal index 94. As further shown in FIG. 2a, the transmission bitrate for the plurality of video streams 112.4 ranges up to about 2,500 kilobits per second (Kbps) or more before the sudden drop in available egress bandwidth, and still ranges up to 2,500 Kbps at about horizontal index 100 after the sudden drop in available egress bandwidth, due to a delay (e.g., 1 second delay) in detection of the sudden drop in available egress bandwidth by the media server 102.

Figure 2B:
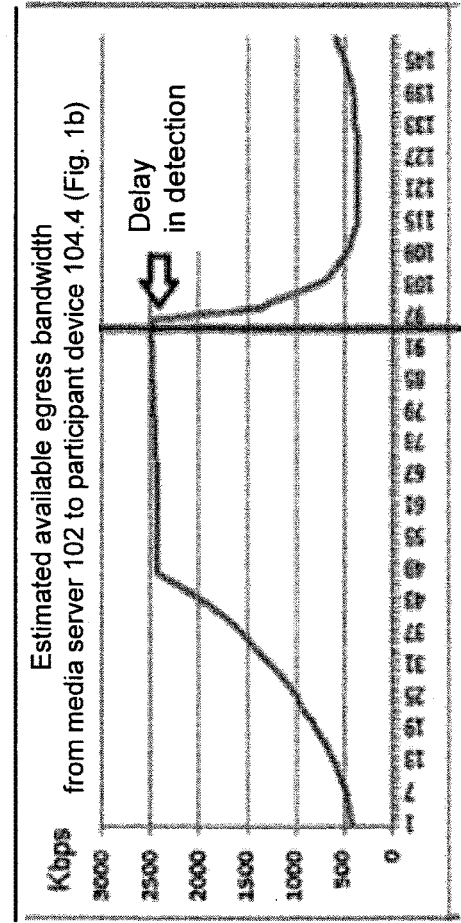
FIG. 2b is a diagram illustrating an estimated available egress bandwidth from the media server of FIG. 1b to the respective participant device of FIG. 1b.

FIG. 2b depicts the diagram 204, which illustrates the available egress bandwidth (estimated at the media server 102) from the media server 102 (see FIG. 1b) to the video receiver device 104.4. As shown in FIG. 2b, the sudden drop in available egress bandwidth from the media server 102 to the video receiver device 104.4 occurs at about horizontal index 94. As further shown in FIG. 2b, the estimated available egress bandwidth from the media server 102 to the video receiver device 104.4 ranges up to about 2,500 Kbps before the sudden drop in available egress bandwidth, and remains at about 2,500 Kbps until about horizontal index 99 after the sudden drop in available egress bandwidth, due to the delay (e.g., 1 second delay) in detection of the sudden drop in available egress bandwidth by the media server 102. Once the sudden drop in available egress bandwidth is detected, the media server 102 sends a request to at least one other participant device among the plurality of participant devices 104.1, 104.2, 104.3, 104.5, and so on, currently sending a video stream to reduce its transmission bitrate, resulting in (i) a reduction of the transmission bitrate from the media server 102 to the video receiver device 104.4 to about 500 Kbps at about horizontal index 121 (see FIG. 2a), and (ii) a more accurate estimate of the available egress bandwidth from the media server 102 to the video receiver device 104.4 of less than 500 Kbps at about horizontal index 121 (see FIG. 2b). In this example, because the detection of the sudden drop in available egress bandwidth from the media server 102 to the video receiver device 104.4 at about horizontal index 94 was delayed (e.g., by 1 second), the transmission bitrate from the media server 102 to the video receiver device 104.4 continued to be high (e.g., above 500 Kbps) from about horizontal index 94 to about horizontal index 121, which can correspond to a time span of about 4 to 5 seconds.

Figure 2C:
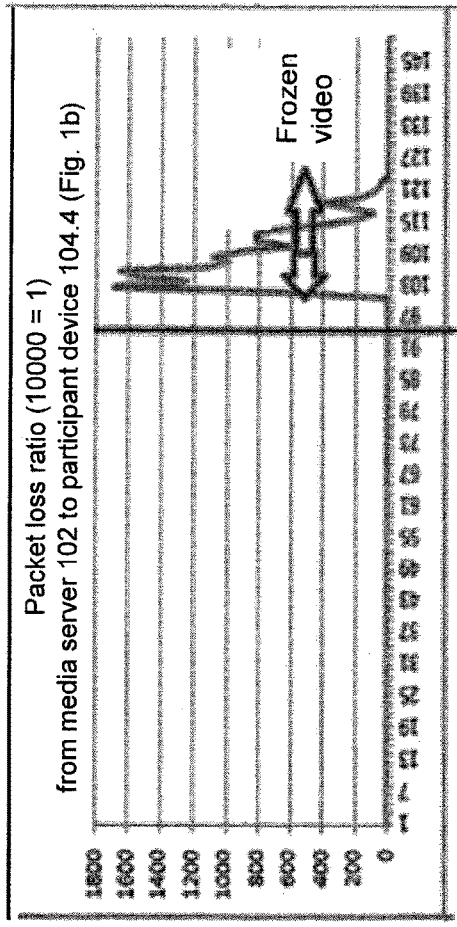
FIG. 2c is a diagram illustrating a packet loss ratio from the media server of FIG. 1b to the respective participant device of FIG. 1b.
Figure 2D:
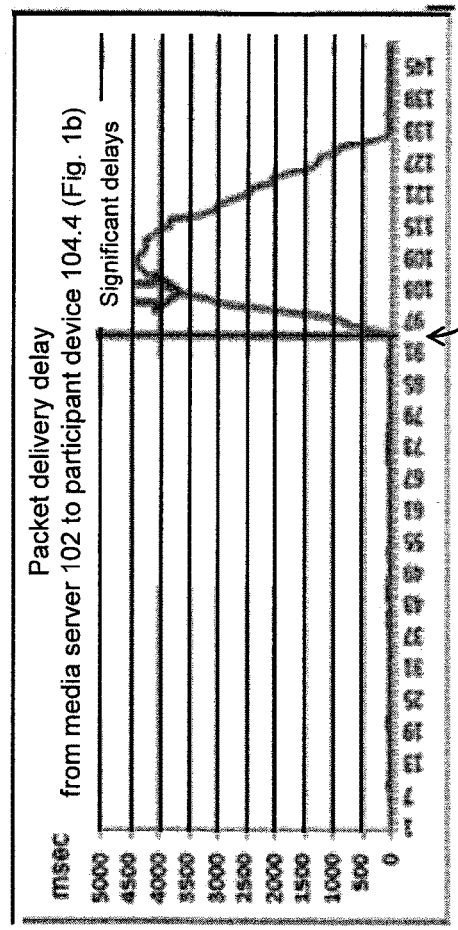
FIG. 2d is a diagram illustrating a packet delivery delay from the media server of FIG. 1b to the respective participant device of FIG. 1b.

FIGS. 2c and 2d illustrate certain detrimental effects resulting from the transmission bitrate continuing to be high for several seconds after the detection of the sudden drop in available egress bandwidth from the media server 102 (see FIG. 1b) to the video receiver device 104.4. FIG. 2c depicts the diagram 206, which illustrates a loss ratio of packets from the media server 102 to the video receiver device 104.4. As shown in FIG. 2c, the sudden drop in available egress bandwidth from the media server 102 to the video receiver device 104.4 occurs at about horizontal index 94. As further shown in FIG. 2c, the loss ratio of packets from the media server 102 to the video receiver device 104.4 ranges up to about 16% or more from about horizontal index 99 to about horizontal index 121, due to the transmission bitrate from the media server 102 to the video receiver device 104.4 continuing to be high (e.g., above 500 Kbps) until about horizontal index 121 (see FIG. 2a). It is noted that such a high packet loss ratio from the media server 102 to the video receiver device 104.4, as illustrated in FIG. 2c, can detrimentally cause frozen video on a display screen of the video receiver device 104.4 from about horizontal index 99 to about horizontal index 121, which can correspond to a time span of about 6 seconds.

FIG. 2d depicts the diagram 208, which illustrates the packet delivery delay from the media server 102 (see FIG. 1b) to the video receiver device 104.4 after the sudden drop in available egress bandwidth. As shown in FIG. 2d, the sudden drop in available egress bandwidth from the media server 102 to the video receiver device 104.4 occurs at about horizontal index 94. As further shown in FIG. 2d, significant packet delivery delays from the media server 102 to the video receiver device 104.4 range up to about 4.5 seconds from about horizontal index 94 to about horizontal index 132, due to the transmission bitrate from the media server 102 to the video receiver device 104.4 continuing to be high (e.g., above 500 Kbps) until about horizontal index 121 (see FIG. 2a). For example, such significant packet delivery delays may result from the media server 102 sending many more packets than the network can handle, causing severe network congestion. It is noted that retransmission of packets requested by the video receiver device 104.4 in order to reduce a resultant packet loss ratio can make the network even more congested. It is further noted that such significant packet delivery delays from the media server 102 to the video receiver device 104.4, as illustrated in FIG. 2d, can detrimentally cause delayed viewing of the plurality of video streams 112.4 (see FIG. 1b) on the display screen of the video receiver device 104.4 from about horizontal index 94 to about horizontal index 132, which can correspond to a time span of about 12 seconds.

Figure 3:
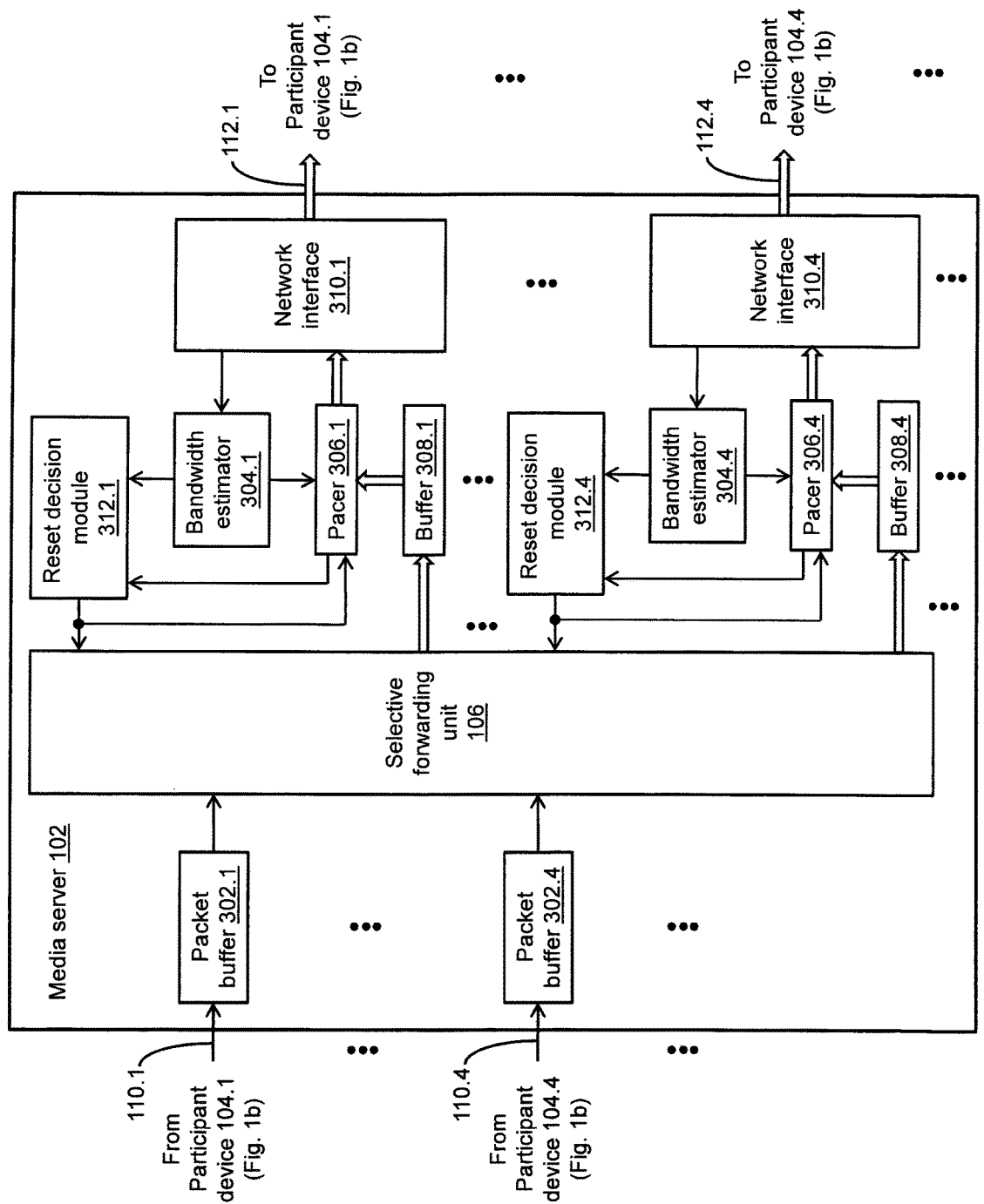
FIG. 3 is a block diagram of an exemplary embodiment of the media server of FIG. 1b configured to handle the sudden drop in available egress bandwidth from the media server to the respective participant device of FIG. 1b.

FIG. 3 depicts an exemplary configuration of the media server 102 for handling the sudden drop in available egress bandwidth to the video receiver device 104.4, thereby avoiding or reducing detrimental effects of packet losses and/or delays in viewing the plurality of video streams 112.4 at the video receiver device 104.4 (see FIG. 1*b*). As shown in FIG. 3, the media server 102 can include the selective forwarding unit (SFU) 106 (see also FIG. 1*b*). The media server 102 can further include a packet buffer 302.1 for receiving one or more video streams from the participant device 104.1 over the communications path 110.1, as well as a buffer 308.1, a pacer 306.1, a bandwidth estimator 304.1, a reset decision module 312.1, and a network interface 310.1 for use in sending the plurality of video streams 112.1 to the participant device 104.1. Likewise, the media server 102 can include a packet buffer 302.4 for receiving a video stream from the video receiver device 104.4 over the communications path 110.4, as well as a buffer 308.4, a pacer 306.4, a bandwidth estimator 304.4, a reset decision module 312.4, and a network interface 310.4 for use in sending the plurality of video streams 112.4 to the video receiver device 104.4. It is noted that the media server 102 can further include multiple such arrangements of packet buffers 302.*x*, buffers 308.*x*, pacers 306.*x*, bandwidth estimators 304.*x*, reset decision modules 312.*x*, and network interfaces 310.*x*, as set forth herein, for receiving/sending video streams from/to the respective participant devices 104.*x*, in which "x" is an integer value ranging from 1 to n.

As described in this example, the plurality of video streams 112.4 (see FIGS. 1*b* and 3) are selectively forwarded or routed by the SFU 106 to the video receiver device 104.4. To that end, the packet buffers 302.1, 302.2, 302.3, 302.5, . . . receive corresponding video streams over the communications paths 110.1, 110.2, 110.3, 110.5, . . . , respectively, and provide the corresponding video streams to the SFU 106, which selectively forwards or routes packets of the respective video streams to the buffer 308.4 (also referred to herein as the "pacer buffer"). The pacer buffer 308.4 provides the packets of the respective video streams to the pacer 306.4, which sends the video streams of packets to the network interface 310.4 at a desired bitrate. For example, the pacer buffer 308.4 (as well as each of the buffers 308.1, 308.2, 308.3, 308.5, . . . ; see FIG. 3) may have a size equal to 2.0 megabits (Mbits), and may be configured to send more video packets than the estimated egress bandwidth to the pacer 306.4 when the total number of video packets in the buffer 308.4 exceeds a predetermined threshold. The network interface 310.4 then provides the video streams of packets, as the plurality of video streams 112.4, to the video receiver device 104.4.

While the plurality of video streams 112.4 are selectively forwarded or routed to the video receiver device 104.4, the bandwidth estimator 304.4 detects the sudden drop in available egress bandwidth from the media server 102 to the video receiver device 104.4. In one embodiment, the bandwidth estimator 304.4 can estimate the available egress bandwidth in accordance with techniques described in U.S. Pat. No. 9,628,411 entitled EFFICIENT PACKET PROCESSING AT VIDEO RECEIVER IN MULTIMEDIA COMMUNICATIONS OVER PACKET NETWORKS issued Apr. 18, 2017. Once the sudden drop in available egress bandwidth to the video receiver device 104.4 has been detected, the media server 102 sends a request to at least one other participant device (also referred to herein as the "video sender device") among the respective participant devices 104.1, 104.2, 104.3, 104.5, . . . currently sending video streams received by the video receiver device 104.4 to reduce its transmission bitrate. For example, the media server 102 may send such requests to reduce a transmission bitrate to the participant devices 104.1, 104.2, 104.3, or 104.5, . . . over communication paths 114.1, 114.2, 114.3, or 114.5, . . . (see FIG. 1*b*), respectively. It is noted that the bandwidth estimator 304.4 also directs the pacer 306.4 to adjust the transmission rate at which the video streams of packets are sent over the network interface 310.4, as desired and/or required, based on the estimated available egress bandwidth to the video receiver device 104.4.

Once the request to reduce the transmission bitrate is sent to the video sender device 104.1, 104.2, 104.3, or 104.5, and so on, the reset decision module 312.4 determines whether to reset the forwarding of the video stream from each of the respective video sender devices to the video receiver device 104.4. In one embodiment, the reset decision module 312.4 can determine whether to reset the forwarding of each video stream to the video receiver device 104.4 based on one or more of the following factors: (i) the transmission bitrate of the respective video sender device, (ii) the available egress bandwidth from the media server 102 to the video receiver device 104.4 (as estimated by the bandwidth estimator 304.4), (iii) the delay from the time when the request to reduce the transmission bitrate is sent to the respective video sender device to the time when the transmission bitrate is actually reduced, (iv) the current packet delivery delay (as determined by the pacer 306.4) (v) the rate of change of the packet delivery delay over time, (vi) the fullness of the pacer buffer 308.4, and (vii) the loss ratio of packets from the media server 102 to the video receiver device 104.4. In one embodiment, having received an RTCP receiver report feedback message at the media server 102 from the video receiver device 104.4, the reset decision module 312.4 can determine whether to reset the forwarding of the video stream to the video receiver device 104.4 based further on one or more of the following additional factors: (viii) the time duration over which a plurality of video packets indicated in the RTCP receiver report feedback message (e.g., receiver report packets) were sent by the media server 102 to the video receiver device 104.4, and (ix) the time duration from when a first one of the plurality of video packets (as indicated in the RTCP receiver report feedback message) was sent by the media server 102 to when the RTCP feedback message was received at the media server 102.

Having determined to reset the forwarding of the video stream from the respective video sender device to the video receiver device 104.4, the media server 102 ceases servicing all subsequent packet retransmission requests. In addition, the reset decision module 312.4 directs the pacer 306.4 to empty the pacer buffer 308.4, and obtains, from the pacer 306.4, the sequence number of the last video packet sent over the network interface 310.4 to the video receiver device 104.4. For example, the reset decision module 312.4 may provide the obtained sequence number to the SFU 106, which may use the sequence number to "hide" a possible sequence number gap in subsequent video packets sent to the video receiver device 104.4. The reset decision module 312.4 also sets a wait time before directing the SFU 106 to send a request for an intra-frame (or I-frame) to the respective video sender device, thereby allowing time for congestion on the egress network to be reduced. For example, the wait time may be shorter when excess video packets are maintained in the pacer buffer 308.4, and may be longer when such excess video packets are in the egress network. Further, if such excess video packets are in both the pacer buffer 308.4 and the egress network, then the wait time may be set between these shorter and longer wait times. Once the wait time has expired, the media server 102 can send the request for an I-frame to the respective video sender device for use in restarting the forwarding of the video stream to the video receiver device 104.4.

In one embodiment, the reset decision module 312.4 can determine whether or not to reset the forwarding of the video stream from the respective video sender device to the video receiver device 104.4 based on a first predetermined function, f( . . . ), of the foregoing factors, as follows:

$$\text{reset\_video\_stream} = f(BR_{incoming}, BW, D_{action}, D_{current}, Slope_{delay}, PB_{fullness}, PLR, RPR). \quad (1)$$

The reset decision module 312.4 can also set the wait time before directing the SFU 106 to send a request for an intra-frame (or I-frame) to the respective video sender device based on a second predetermined function, g( . . . ), of the foregoing factors, as follows:

$$\text{wait\_time} = g(BR_{incoming}, BW, D_{action}, D_{current}, Slope_{delay}, PB_{fullness}, PLR, RPR). \quad (2)$$

In each of equations (1) and (2), "$BR_{incoming}$" corresponds to the bitrate of incoming video from the respective video sender device, "BW" corresponds to the available egress bandwidth from the media server 102 to the video receiver device 104.4, "$D_{action}$" corresponds to the delay from the time when the request to reduce the transmission bitrate is sent to the respective video sender device to the time when action is taken to reduce the transmission bitrate, "$D_{current}$" corresponds to the current packet delivery delay, "$Slope_{delay}$" corresponds to the rate of change of the packet delivery delay over time, "$PB_{fullness}$" corresponds to the fullness of the pacer buffer 308.4, "PLR" corresponds to the packet loss ratio from the media server 102 to the video receiver device 104.4, and "RPR" corresponds to the received packet ratio of (i) the time duration over which a plurality of video packets indicated in the RTCP receiver report feedback message were sent by the media server 102 to the video receiver device 104.4, to (ii) the time duration from when a first one of the plurality of video packets indicated in the RTCP receiver report feedback message was sent by the media server 102 to when the RTCP feedback message was received at the media server 102.

It is noted that certain ones of the foregoing factors can have a greater influence than others for determining whether to reset the forwarding of the video stream to the video receiver device 104.4 (reset_video_stream; see equation (1)), as well as setting the wait time before directing the SFU 106 to send a request for an I-frame to the respective video sender device (wait_time; see equation (2)). In another embodiment, the determination of whether to reset the forwarding of the video stream to the video receiver device 104.4 can be made based on a third predetermined function, f1 ( . . . ), of a reduced group of the foregoing factors, as follows:

$$\text{reset\_video\_stream} = f1(BR_{incoming}, BW, D_{current}, Slope_{delay}, PB_{fullness}, PLR, RPR). \quad (3)$$

Further, the setting of the wait time before directing the SFU 106 to send a request for an I-frame to the respective video sender device can be determined based on a fourth predetermined function, g1 ( . . . ), of another reduced group of the foregoing factors, as follows:

$$\text{wait\_time} = g1(BR_{incoming}, BW, D_{action}). \quad (4)$$

It is noted that other suitable groupings of the foregoing factors in the function "f1( . . . )" (see equation (3)) and/or the function "g1( . . . )" (see equation (4)) are possible.

As described herein, the reset decision module 312.4 can determine whether or not to reset the forwarding of the video stream from the respective video sender device to the video receiver device 104.4 based on the function "f( . . . )" (see equation (1)) or the function "f1( . . . )" (see equation (3)) of at least some of the factors, "$BR_{incoming}$," "BW," "$D_{action}$," "$D_{current}$," "$Slope_{delay}$," "$PB_{fullness}$," "PLR," and "RPR." In one embodiment, the value of "reset_video_stream" in equation (1) (as well as in equation (3)) can be determined on a sliding scale, in which one end of the sliding scale tends toward an affirmative decision to reset the forwarding of the video stream from the respective video sender device, while the other end of the sliding scale tends toward the opposite decision not to reset the forwarding of the video stream. With regard to the factors, "$BR_{incoming}$," "BW," "$D_{action}$," "$D_{current}$," "$Slope_{delay}$," "$PB_{fullness}$," "PLR," and "RPR," the value of "reset_video_stream" (see, e.g., equation (1)) on the sliding scale can tend toward the affirmative decision to reset the forwarding of the video stream under the following conditions:

(a) the ratio of "$BR_{incoming}$" to "BW" increases (congestion on the egress network can increase as the value of "$BR_{incoming}$" increases relative to the value of "BW");

(b) the value of "$D_{action}$" increases (congestion on the egress network can increase as the value of "$D_{action}$" increases);

(c) the value of "$D_{current}$" increases (congestion on the egress network can increase as the value of "$D_{current}$" increases);

(d) the value of "$Slope_{delay}$" increases (the egress network can become increasingly congested as the value of "$Slope_{delay}$" increases);

(e) the value of "$PB_{fullness}$" increases (delays in viewing video streams at the video receiver device can increase as the value of "$PB_{fullness}$" increases);

(f) the value of "PLR" increases (an increase in the value of "PLR" can be indicative of problems in the egress network); and (g) the value of "RPR" decreases (a decrease in the value of "RPR" can be indicative of a sudden delay in packet transmission).

As further described herein, the reset decision module 312.4 can set the wait time before directing the SFU 106 to send a request for an I-frame to the respective video sender device based on the function "g( . . . )" (see equation (2)) or the function "g1( . . . )" (see equation (4)) of at least some of the factors, "$BR_{incoming}$," "BW," "$D_{action}$," "$D_{current}$," "$Slope_{delay}$," "$PB_{fullness}$," "PLR," and "RPR." The value of "wait_time" in equation (2) (as well as in equation (4)) is also determined on a sliding scale, in which one end of the sliding scale tends toward a longer wait time before sending the request for an I-frame, while the other end of the sliding scale tends toward a shorter wait time before sending the request for an I-frame. With regard to the factors, "$BR_{incoming}$," "BW," "$D_{action}$," "$D_{current}$," "$Slope_{delay}$," "$PB_{fullness}$," "PLR," and "RPR," the value of "wait_time" (see, e.g., equation (2)) on the sliding scale can tend toward an increased value (i.e., a longer wait time) under the following conditions:

(a) the ratio of "$BR_{incoming}$" to "BW" increases (more time can be required to reduce congestion on the egress network as the value of "$BR_{incoming}$" increases relative to the value of "BW");

(b) the value of "$D_{action}$" increases (more time can be required to reduce congestion on the egress network as the value of "$D_{action}$" increases);

(c) the value of "$D_{current}$" increases (more time can be required to reduce congestion on the egress network as the value of "$D_{current}$" increases);

(d) the value of "$Slope_{delay}$" increases (more time can be required to reduce congestion on the egress network as the value of "$Slope_{delay}$" increases);

(e) the value of "$PB_{fullness}$" increases (delays in viewing video streams at the video receiver device can increase as the value of "$PB_{fullness}$" increases, potentially leading to more time being required to reduce congestion on the egress network);

(f) the value of "PLR" increases (an increase in the value of "PLR" can be indicative of problems in the egress network, potentially leading to more time being required to reduce congestion on the egress network); and (g) the value of "RPR" decreases (a decrease in the value of "RPR" can be indicative of a sudden delay in packet transmission, potentially leading to more time being required to reduce congestion on the egress network).

Figure 4:
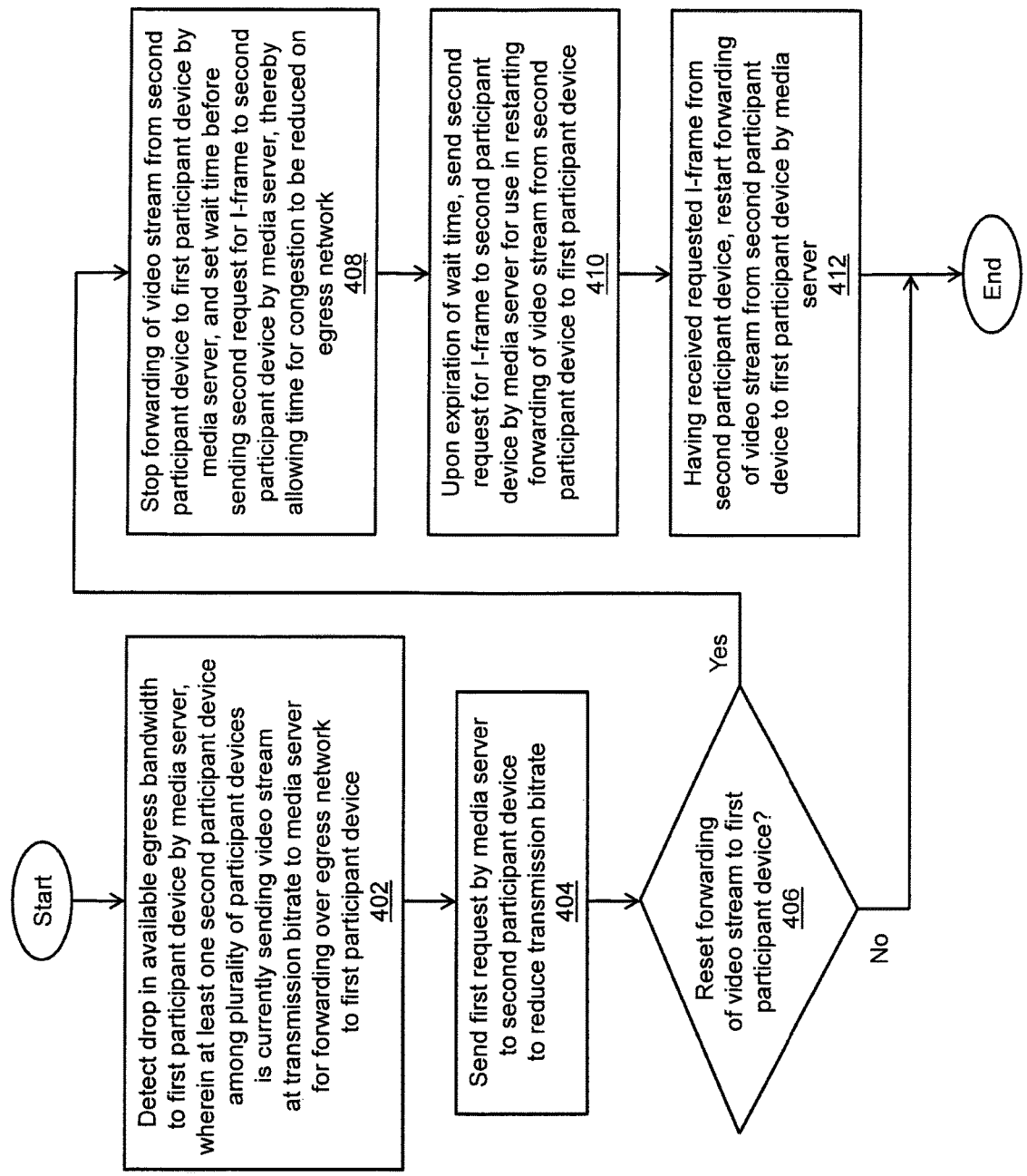
FIG. 4 is a flow diagram of an exemplary method of handling a sudden drop in available egress bandwidth from a media server having an SFU architecture to a respective participant device among a plurality of participant devices communicably coupled to the media server.

An exemplary method of handling a sudden drop in available egress bandwidth from a media server having an SFU architecture to a first participant device among a plurality of participant devices communicably coupled to the media server is described below with reference to FIG. 4. As depicted in block 402, a drop in available egress bandwidth to the first participant device is detected by the media server, wherein at least one second participant device among the plurality of participant devices is currently sending a video stream at a transmission bitrate to the media server for forwarding over an egress network to the first participant device. As depicted in block 404, a first request is sent, by the media server, to the second participant device to reduce the transmission bitrate. As depicted in block 406, a determination is made as to whether or not to reset the forwarding of the video stream currently being sent by the second participant device to the first participant device. As depicted in block 408, having determined to reset the forwarding of the video stream currently being sent by the second participant device to the first participant device, the forwarding of the video stream from the second participant device to the first participant device is stopped by the media server (in order to empty or clear the pacer buffer), and a wait time before sending a second request for an I-frame to the second participant device is set by the media server, thereby allowing time for congestion to be reduced on the egress network. As depicted in block 410, upon expiration of the wait time, the second request for an I-frame is sent to the second participant device by the media server for use in restarting the forwarding of the video stream from the second participant device to the first participant device. As depicted in block 412, having received the requested I-frame from the second participant device, the forwarding of the video stream from the second participant device to the first participant device is restarted by the media server.

It is noted that the operations herein described are purely exemplary and imply no particular order. Further, the operations can be used in any sequence when appropriate and can be partially used. With the above illustrative embodiments in mind, it should be understood that the above-described systems and methods might employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems and methods are useful machine operations. The above-described systems and methods also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems and methods can also be embodied as a computer program product including computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

While various embodiments of the invention have been particularly shown and described, it will be understood by those skilled in the art that various changes in form and details may be made therein without departing from the scope of the invention as defined by the appended claims.

What is claimed is:

1. A method of a media server having a selective forwarding unit (SFU) architecture, comprising:
   sending a request to a first participant device to reduce a transmission bitrate of a video stream;
   determining whether to reset forwarding of the video stream to a second participant device; and
   having determined to reset the forwarding of the video stream to the second participant device, sending a request for an I-frame to the first participant device for use in restarting the forwarding of the video stream to the second participant device.

2. The method of claim 1 further comprising:
   having received the requested I-frame from the first participant device, restarting the forwarding of the video stream from the first participant device to the second participant device.

3. The method of claim 1 wherein the determining of whether to reset the forwarding of the video stream is based on a predetermined function of at least some of (i) the transmission bitrate, (ii) an available egress bandwidth to the second participant device, (iii) a delay from when the request to reduce the transmission bitrate was sent to when the transmission bitrate was reduced, (iv) a packet delivery delay from the media server to the second participant device, (v) a rate of change of the packet delivery delay over time, (vi) a fullness of a pacer buffer, and (vii) a packet loss ratio from the media server to the second participant device.

4. The method of claim 3 wherein the determining of whether to reset the forwarding of the video stream includes determining a value of the predetermined function on a sliding scale, wherein one end of the sliding scale tends toward an affirmative decision to reset the forwarding of the video stream, and wherein the value of the predetermined function tends toward the affirmative decision as one or more of (i) a ratio of the transmission bitrate to the available egress bandwidth increases, (ii) the delay from when the request to reduce the transmission bitrate was sent to when the transmission bitrate was reduced increases, (iii) the packet delivery delay increases, (iv) the rate of change of the packet delivery delay over time increases, (v) the fullness of the pacer buffer increases, and (vi) the packet loss ratio increases.

5. The method of claim 1 further comprising:
receiving a real-time control protocol (RTCP) receiver report feedback message from the second participant device,
wherein the determining of whether to reset the forwarding of the video stream is based on a predetermined function of one or more of (i) a first time duration during which a plurality of packets indicated in the RTCP receiver report feedback message were sent by the media server to the second participant device, and (ii) a second time duration from when a first one of the plurality of packets indicated in the RTCP receiver report feedback message was sent to when the RTCP receiver report feedback message was received.

6. The method of claim 1 further comprising:
having determined to reset the forwarding of the video stream, setting a wait time before sending the request for the I-frame to the first participant device to allow time for congestion to be reduced on an egress network to the second participant device.

7. The method of claim 6 wherein the setting of the wait time is based on a predetermined function of at least some of (i) the transmission bitrate, (ii) an available egress bandwidth to the second participant device, (iii) a delay from when the request to reduce the transmission bitrate was sent to when the transmission bitrate was reduced, (iv) a packet delivery delay from the media server to the second participant device, (v) a rate of change of the packet delivery delay over time, (vi) a fullness of a pacer buffer, and (vii) a packet loss ratio from the media server to the second participant device.

8. The method of claim 7 wherein the setting of the wait time includes determining a value of the predetermined function on a sliding scale, wherein one end of the sliding scale tends toward a longer wait time before sending the request for the I-frame, and wherein the value of the predetermined function tends toward the longer wait time as one or more of (i) a ratio of the transmission bitrate to the available egress bandwidth increases, (ii) the delay from when the request to reduce the transmission bitrate was sent to when the transmission bitrate was reduced increases, (iii) the packet delivery delay increases, (iv) the rate of change of the packet delivery delay over time increases, (v) the fullness of the pacer buffer increases, and (vi) the packet loss ratio increases.

9. The method of claim 6 further comprising:
receiving a real-time control protocol (RTCP) receiver report feedback message from the second participant device,
wherein the setting of the wait time is based on a predetermined function of one or more of (i) a first time duration during which a plurality of packets indicated in the RTCP receiver report feedback message were sent by the media server to the second participant device, and (ii) a second time duration from when a first one of the plurality of packets indicated in the RTCP receiver report feedback message was sent to when the RTCP receiver report feedback message was received.

10. The method of claim 6 wherein the setting of the wait time includes reducing the wait time to a first wait time if excess packets are maintained in a pacer buffer.

11. The method of claim 10 wherein the setting of the wait time includes increasing the wait time to a second wait time greater than the first wait time if the excess packets are in an egress network to the second participant device.

12. The method of claim 11 wherein the setting of the wait time includes setting the wait time to an intermediate time between the first wait time and the second wait time if a first portion of the excess packets are maintained in the pacer buffer and a second portion of the excess packets are in the egress network.

13. The method of claim 1 further comprising:
having determined to reset the forwarding of the video stream, stopping the forwarding of the video stream from the first participant device to the second participant device.

14. The method of claim 1 further comprising:
detecting a decrease in an available egress bandwidth to the second participant device.

15. A media server having a selective forwarding unit (SFU) architecture, comprising:
processing circuitry configured to execute program instructions out of a memory to:
send a request to a first participant device to reduce a transmission bitrate of a video stream;
determine whether to reset forwarding of the video stream to a second participant device; and
having determined to reset the forwarding of the video stream to the second participant device, send a request for an I-frame to the first participant device for use in restarting the forwarding of the video stream to the second participant device.

16. The media server of claim 15 wherein the processing circuitry is further configured to execute the program instructions out of the memory, having received the requested I-frame from the first participant device, to restart the forwarding of the video stream from the first participant device to the second participant device.

17. The media server of claim 15 wherein the processing circuitry is further configured to execute the program instructions out of the memory, having determined to reset the forwarding of the video stream, to set a wait time before sending the request for the I-frame to the first participant device to allow time for congestion to be reduced on an egress network to the second participant device.

18. A computer program product including non-transitory, computer-readable media having instructions that, when executed by processing circuitry of a media server having a selective forwarding unit (SFU) architecture, cause the processing circuitry to perform a method of handling a decrease in available egress bandwidth from the media server to a participant device among a plurality of participant devices, the method comprising:
sending a request to a first participant device to reduce a transmission bitrate of a video stream;
determining whether to reset forwarding of the video stream to a second participant device; and
having determined to reset the forwarding of the video stream to the second participant device, sending a request for an I-frame to the first participant device for use in restarting the forwarding of the video stream to the second participant device.

19. The computer program product of claim 18 wherein the method further comprises:
having received the requested I-frame from the first participant device, restarting the forwarding of the video stream from the first participant device to the second participant device.

20. The computer program product of claim 18 wherein the method further comprises:

having determined to reset the forwarding of the video stream, setting a wait time before sending the request for the I-frame to the first participant device to allow time for congestion to be reduced on an egress network to the second participant device.

* * * * *